(12) United States Patent
Sasaki et al.

(10) Patent No.: US 7,440,991 B2
(45) Date of Patent: Oct. 21, 2008

(54) DIGITAL CIRCUIT

(75) Inventors: Tsuneki Sasaki, Kanagawa (JP); Junichiro Minamitani, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 765 days.

(21) Appl. No.: 11/078,379

(22) Filed: Mar. 14, 2005

(65) Prior Publication Data
US 2005/0203984 A1    Sep. 15, 2005

(30) Foreign Application Priority Data
Mar. 15, 2004    (JP)    ............................. 2004-073589

(51) Int. Cl.
*G06F 7/508*    (2006.01)
(52) U.S. Cl. ..................................... 708/710
(58) Field of Classification Search ................. 708/710
See application file for complete search history.

(56) References Cited
U.S. PATENT DOCUMENTS
5,508,952 A * 4/1996 Kantabutra ................. 708/712

2003/0145033 A1* 7/2003 Bradley et al. .............. 708/710
2004/0073593 A1* 4/2004 Wen ........................... 708/710
2004/0167957 A1* 8/2004 Choi .......................... 708/710
2004/0267862 A1* 12/2004 Rarick ........................ 708/710

FOREIGN PATENT DOCUMENTS
JP    2000-163251    6/2000

* cited by examiner

*Primary Examiner*—David H Malzahn
(74) *Attorney, Agent, or Firm*—McGinn IP Law Group, PLLC

(57) ABSTRACT

Disclosed is a digital circuit which comprises input signals A[n−1:0], SH[$\log_2$n−1:0], and DAT[n−1:0], a barrel shifter for outputting data B[n−1:0] obtained by shifting the signal DAT by the bits of the signal SH, a group G·P·SUM computation stage for dividing each of the digits of the input signals A and B into groups of m bits, and computing Gs, Ps, and addition results SUM0 when carry inputs are high and addition results SUM1 when the carry inputs are low, a carry computation circuit for computing a carry for each of the groups, and a SUM selection stage for selecting a SUM0 or a SUM1 computed for each of the groups according to each carry output by the carry computation circuit.

7 Claims, 9 Drawing Sheets

DIGITAL CIRCUIT

FIELD OF THE INVENTION

The present invention relates to a digital circuit.

BACKGROUND OF THE INVENTION

In recent years, with development of portable terminals, speeding up of data processing has become essential, so that speeding up of computation processing of RISC CPUs mounted on portable terminals is also required. When compression and expansion of a photograph image (in JPEG format) is performed in the portable terminal, for example, a DCT (Discrete Cosine Transform)/quantization/inverse-quantitization techniques are employed. Speeding up of multiplication is then required.

Generally, for the multiplication by the RISC CPU, there are provided a method of using a barrel shifter and an adder and a method of using a multiplier. A program compiler makes a decision as to which method is faster according to a multiplier, and determines the method. The case where the multiplication is executed using the barrel shifter and the adder is the case where a multiplier factor $2^{m+1}$ ($m \geq 1$) is applied on a certain number A, for example. In this case, the certain number A is shifted in the left by m bits by the barrel shifter to produce $2m \cdot A$. Then, $2m \cdot A + A$ is executed by the adder to obtain the solution. Since the latencies of the barrel shifter and the adder of the RISC CPU are generally one clock cycle, respectively, the latency of this multiplication becomes two clock cycles. The latency of the multiplier is three clock cycles. Thus, if the barrel shifter and the adder are used, the multiplication can be performed faster by one clock cycle than in the case where the multiplier is used.

In ARM CPUs, the barrel shifter and the adder are connected in series so that the multiplication is executed in one clock cycle. Then, the latency in the method of using the barrel shifter and the adder is thereby reduced to achieve speeding up of the multiplication. The multiplication described before can be thereby implemented in one clock cycle. Further, the multiplication in which the multiplier factor applied on the certain number A is $2^{m+n}+2^m+2^n+1 = (2^m+1)(2^n+1)$ can also be implemented in two clock cycles.

[Patent Document 1]
JP Patent Kokai Publication No. JP-P2000-163251A

SUMMARY OF THE DISCLOSURE

However, since the delays of the barrel shifter and the adder are large, this path often becomes critical (refer to FIG. 5).

The present invention has been made in view of the circumstances described above.

A digital circuit according to the present invention includes:

a computation unit for receiving a signal a of two of the signal a and a signal b both with a number of bits therein being m, wherein the signals a and b range from zero to $2^{m-1}$, and calculating for the signal a and each of $2^m$ values of zero to $2^{m-1}$ a carry generate term $G_i$, a carry propagate term $P_i$, and a sum $S_i$, wherein i ranges from zero to $2^{m-1}$, for output; and a selection unit for receiving the carry generate term $G_i$, the carry propagate term $P_i$, and the sum $S_i$ computed by the computation unit and the signal b, and selecting the carry generate term $G_b$, the carry propagate term $P_b$, and the sum $S_b$ when i is equal to the signal b, for output.

In the digital circuit according to the present invention, the computation unit performs computation between the signal a and all of the possible values of the signal b, irrespective of the values of the signal b. Then, the correct one of the results of the computation is selected by the selection unit. For this reason, when this digital circuit is employed for part of the adder and the signal b is connected to the output of the barrel shifter, part of an addition operation and the operation of the barrel shifter can be performed simultaneously. Accordingly, the digital circuit that can speed up a multiplication operation is implemented.

On contrast therewith, a conventional circuit in which the barrel shifter is connected to the adder in series has no choice but to perform the addition operation after waiting for the output of the barrel shifter. Thus, the conventional circuit is insufficient in terms of speeding up of the multiplication operation.

In the present invention, the selection unit may output a sum $S0_b$, which is the sum $S_b$ when a carry input is zero and a sum $S1_b$, which is the sum $S_b$ when the carry input is one, respectively. In this case, the circuit can perform computation in regard to the result of the addition (the sum $S0_b$ or the sum $S1_b$) without waiting for computation of a carry input. Accordingly, the digital circuit that can further speed up the multiplication operation is implemented.

The digital circuit according to the present invention may further include:

a carry computation unit for receiving the carry generate term $G_b$ and the carry propagate term $P_b$ to compute the carry input, for output; and a second selection unit for selecting either of the sum $S0_b$ and the sum $S1_b$ according to the carry input computed by the carry computation unit, for output.

In this case, an addition circuit that can speed up the multiplication operation is implemented.

The digital circuit according to the present invention may further include a barrel shifter for outputting the signal b to be input to the selection unit. In this case, a multiplication circuit that can perform the multiplication operation at a faster speed is implemented.

The meritorious effects of the present invention are summarized as follows.

According to the present invention, the digital circuit that can speed up the multiplication operation is implemented.

Still other advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED EMBODIMENTS OF THE INVENTION

Figure 1:
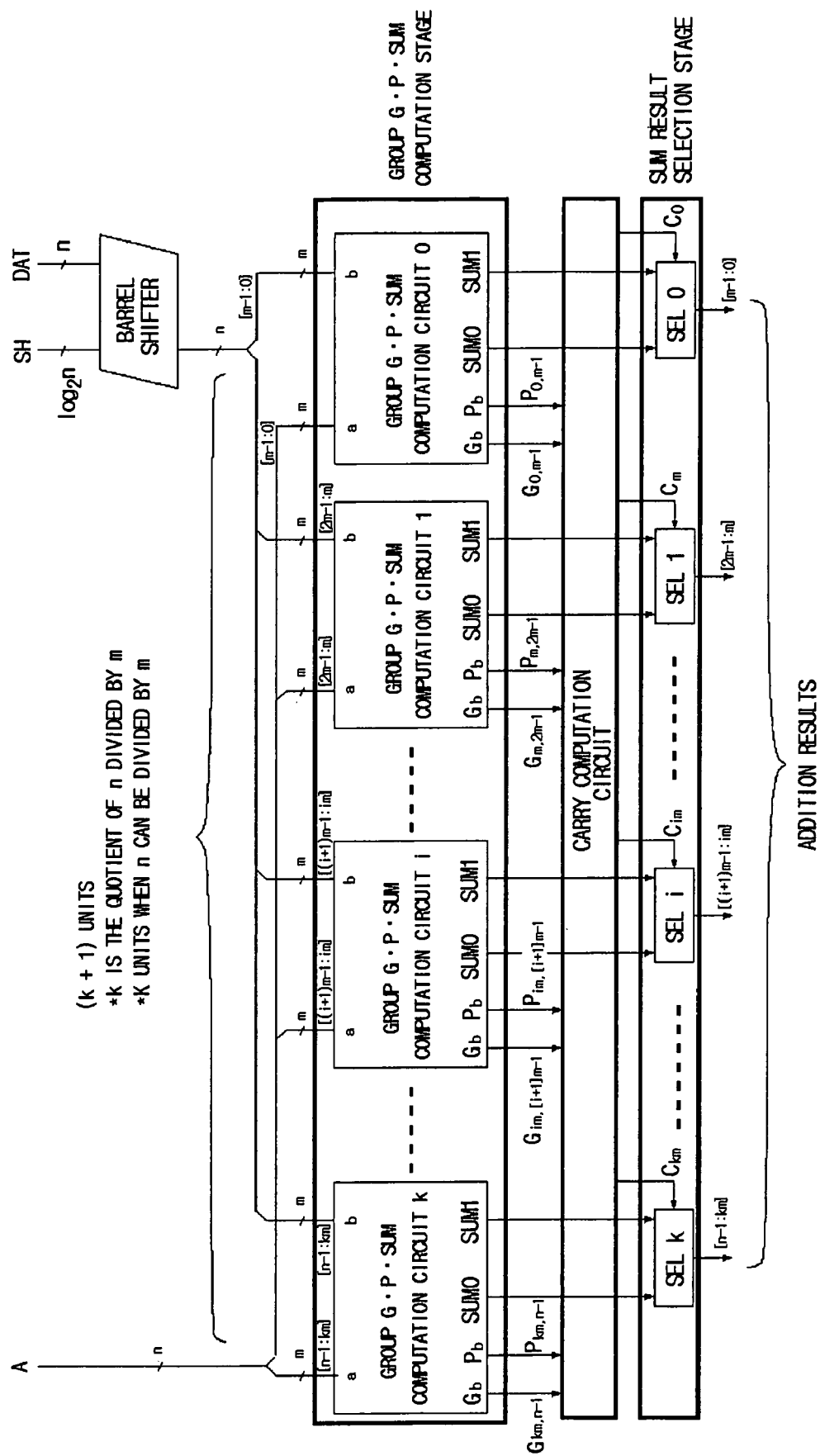
FIG. 1 is a diagram showing a configuration of a digital circuit according to an embodiment of the present invention.

A preferred embodiment of a digital circuit according to the present invention will be described in detail with reference to drawings. For description of the drawings, the same reference characters are assigned to the same elements, and a repetitive description will be omitted.

FIG. 1 is a diagram showing an embodiment of the digital circuit according to the present invention. This circuit comprises input signals A[n−1:0], SH[log$_2$n−1:0], and DAT[n−1:0] a barrel shifter for outputting data B[n-1:0] obtained by shifting the signal DAT by the bits represented by the signal SH, a group G·P·SUM computation stage for dividing each of the digits of the signal A and the data B into groups of m bits and computing Gs, Ps, addition results SUM0 when carry inputs are low and addition results SUM1 when the carry inputs are high, a carry computation circuit for computing a carry for each of the groups, and an SUM selection stage for selecting a SUM0 or a SUM1 calculated for each of the groups according to each carry output by the carry computation circuit.

Since the configuration of the group G·P·SUM computation stage is complex, a description will be first given to (k+1) group G·P·SUM computation circuits constituting the group G·P·SUM computation stage, in which k is the quotient of n divided by m. Then, a description will be next directed to the detailed configurations of the group G·P·SUM computation stage, carry computation circuit, and SUM selection stage, in this stated order.

Figure 2:
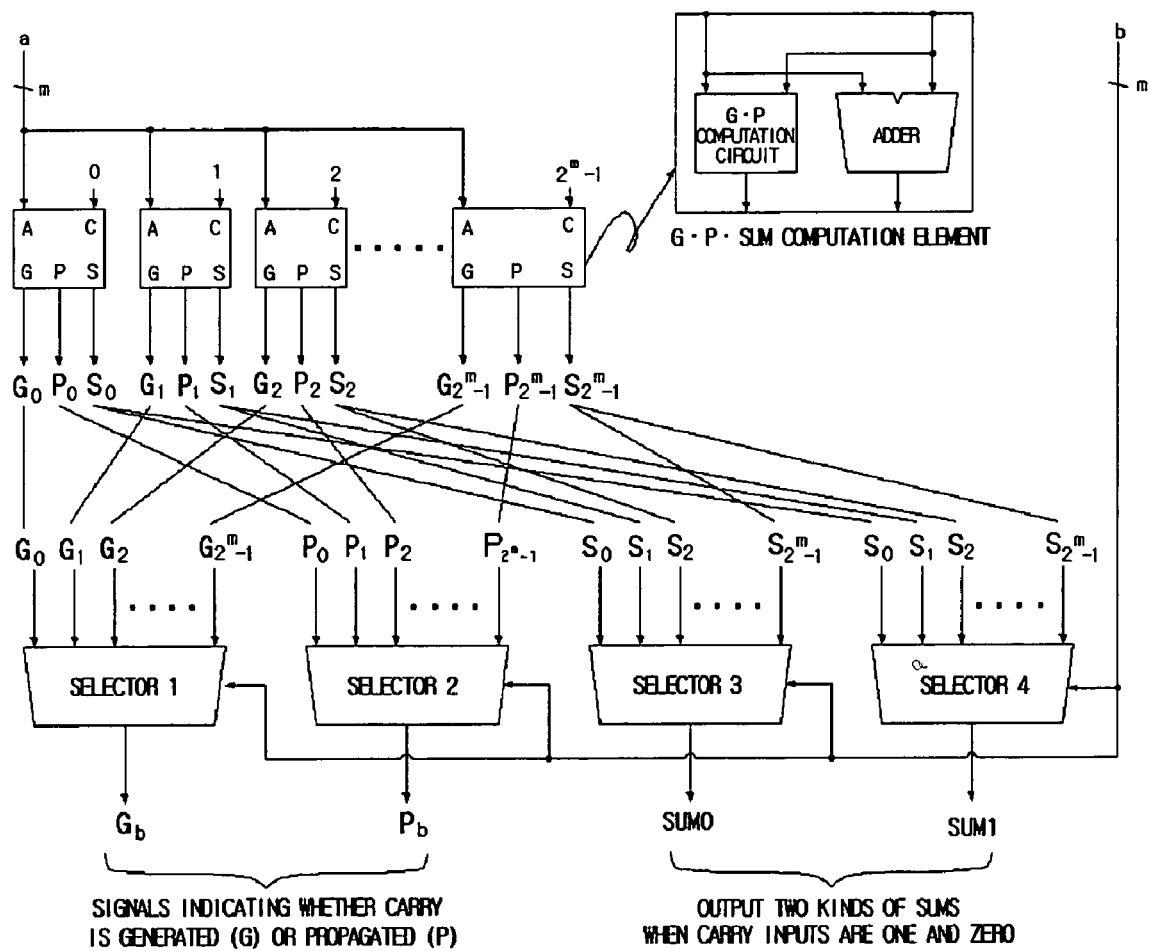
FIG. 2 is a diagram showing a configuration of a group G·P·Sum computation circuit according to the embodiment of the present invention.
Figure 3:
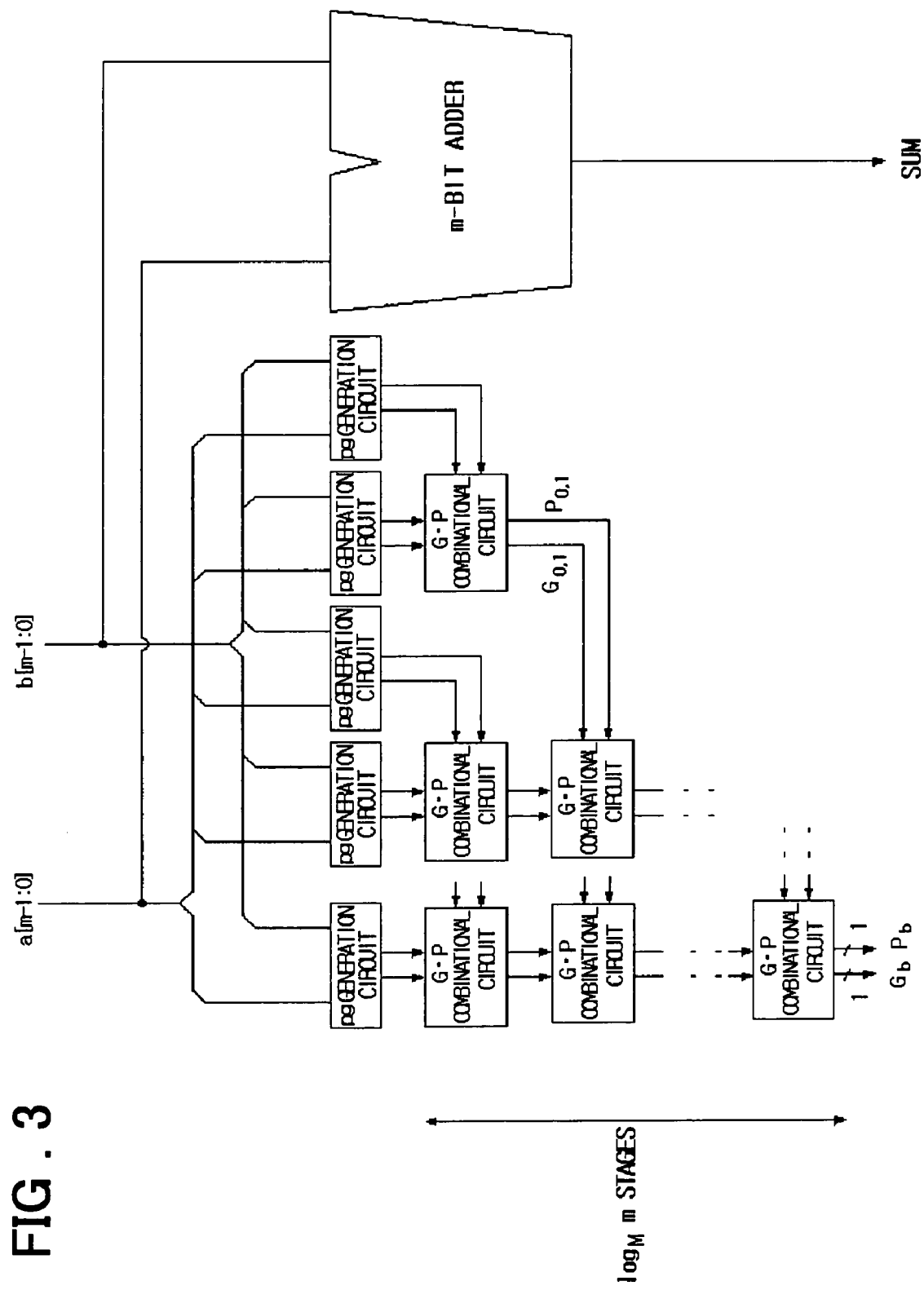
FIG. 3 is a diagram showing a detailed configuration of a G·P·Sum computation element according to the embodiment of the present invention.

Each group G·P·SUM computation circuit has input terminals a and b for inputting respective m bits of the A and the B, and output terminals G$_b$, P$_b$, SUM0 and SUM1 for outputting a group carry generate term, a group carry propagate term, the result of addition when an input of a carry from a lower bit is low and the result of addition when the input of the carry from the lower bit is high, respectively. As shown in FIG. 2, this group G·P·SUM computation circuit is constituted from $2^m$ modules each constituted from a G·P computation circuit (refer to FIG. 8) and an adder (which will be referred to as G·P·SUM computation elements) and four selectors.

A first G·P·SUM computation element outputs results of computation of G, P, and SUM with respect to the input terminal a and zero as a G$_0$, a P$_0$ and an SUM$_0$. A second G·P·SUM computation element outputs results of computation of G, P, and SUM with respect to the input terminal a and one as a G$_1$, a P$_1$ and an SUM$_1$. A third G·P·SUM computation element outputs results of computation of G, P, and SUM with respect to the input terminal a and two as a G$_2$, a P$_2$ and an SUM$_2$. An ith G·P·SUM computation element (in which $1 \leq i \leq 2^m$) outputs results of computation G, P, and SUM with respect to the input terminal a and i−1 as a G$_{i-1}$, a P$_{i-1}$, and an SUM$_{i-1}$. Then, a $2^m$ G·P·SUM is output as follows:

$$G_{2^m-1}, P_{2^m-1}, SUM_{2^m-1}$$

Four selectors select the values based on Table 1, according to an input signal b.

TABLE 1

| b | G$_b$ | P$_b$ | Sum0 | Sum1 |
| --- | --- | --- | --- | --- |
| 0 | G$_0$ | P$_0$ | S$_0$ | S$_1$ |
| 1 | G$_1$ | P$_1$ | S$_1$ | S$_2$ |
| 2 | G$_2$ | P$_2$ | S$_2$ | S$_3$ |
| 3 | G$_3$ | P$_3$ | S$_3$ | S$_4$ |
| . | . | . | . | . |
| . | . | . | . | . |
| . | . | . | . | . |
| $2^m-2$ | G$_{2^m-2}$ | P$_{2^m-2}$ | S$_{2^m-2}$ | S$_{2^m-1}$ |
| $2^m-1$ | G$_{2^m-1}$ | P$_{2^m-1}$ | S$_{2^m-1}$ | S$_0$ |

The detailed configurations of respective units constituting the circuit in FIG. 1 will be described below.

The G·P·SUM computation stage comprises a group G·P·SUM computation circuit 0, a second group G·P·Sum computation circuit 1, a group G·P·Sum computation circuit i, and a group G·P·Sum computation circuit k. The group G·P·SUM computation circuit 0 receives an A[m−1:0] of the input signal A (m≦n) and a B[m−1:0] of the shifted data B at the input terminals a and b thereof, respectively, and outputs a group carry generate term G$_{0,m-1}$, a group carry propagate term P$_{0,m-1}$, an addition result SUM0$_0$ when the input of a carry from a lower bit is low and an addition result SUM1$_0$ when the input of the carry from the lower bit is high. The second group G·P·SUM computation circuit 1 outputs a group carry generate term G$_{m,2m-1}$, a group carry propagate term P$_{m,2m-1}$, an addition result SUM0$_1$ when the input of a carry from a lower bit is low, and an addition result SUM1$_1$ when the input of the carry from the lower bit is high, for an A[2m−1:m] and a B[2m−1:m]. The group G·P·SUM computation circuit i outputs a group carry generate term G$_{im,(i+1)m-1}$, a group carry propagate term P$_{im,(i+1)m-1}$, an addition result SUM0$_i$ when the input of a carry from a lower bit is low, and an addition result SUM1$_i$ when the input of the carry from the lower bit is high, for an A[im−1:(i−1)m] and a B[im−1:(i−1)m], (in which 0≦i≦k) (and in which k is the quotient of n divided by m). The group G·P·SUM computation circuit k outputs a group carry generate term G$_{km,n-1}$, a group carry propagate term P$_{km,n-1}$, an addition result SUM0$_k$ when the input of a carry from a lower bit is low, and an addition result of SUM1$_k$ when the input of the carry from the lower bit is high, for an A[n−1:km] and a B[n−1:km].

As the carry computation circuit, a CLA (Carry Look Ahead) circuit, for example, is used, as in the prior art. The carry computation circuit receives the G$_{0,m-1}$, the P$_{0,m-1}$, and a carry input c$_0$ from the adder, and outputs a carry input C$_m$ for the mth digit according to the following equation (9). The carry computation circuit receives the G$_{im,(i+1)m-1}$, P$_{im,(i+1)m-1}$, c$_0$ and outputs a carry input c$_{im}$ for the 2mth digit, and receives G$_{km,n-1}$, P$_{km,n-1}$, and c$_0$ for output of a carry output c$_{km}$ of the adder.

The SUM computation stage comprises a selector SEL 0, a selector SEL 1, a SEL i, and a selector SEL k. The selector SEL 0 receives SUM0$_0$, SUM1$_0$, and c$_0$ and outputs the SUM0$_0$ when the c$_0$ is low, and outputs the SUM1$_0$ when the c$_0$ is high. The selector SEL 1 receives the SUM0$_1$, SUM1$_1$, and c$_m$, and outputs the SUM0$_1$ when the c$_m$ is low and outputs the SUM1$_1$, when the c$_m$ is high. The SEL i receives the SUM0$_i$, SUM1$_i$, and c$_{im}$, and outputs the SUM0$_i$ when the c$_{im}$ is low and outputs the SUM1$_i$ when the c$_{im}$ is high, (in which 0≦i≦k). The selector SEL k receives the SUM0$_k$, the SUM1$_k$, and a C$_k$, and outputs the SUM0$_k$ when the c$_{km}$ is low, and outputs the SUM1$_k$ when the c$_{km}$ is high.

In the embodiment described above, a configuration is shown in which four selectors are provided for each group G·P·SUM computation circuit, and among those, two selectors output the result of addition when the input of a carry is low and the result of addition when the input of the carry is high, respectively. It may also be configured that the outputs of the respective G·P·SUM calculating elements are output without alteration. More specifically, it may be so configured that one of the selectors selects a $SUM_b$ corresponding to the input signal b among the values of $SUM_i$ computed on all i (in which $0 \leq i \leq 2^{m-1}$) by the G·P·SUM calculating elements, for output.

A difference between delay times of the circuit in FIG. 1 and a circuit according to the prior art will be determined below. For this purpose, the delay of a critical path when the barrel shifter is connected in series with the adder in the prior art (refer to FIG. 5) will be discussed.

(Delay of Barrel Shifter)

When an input data signal is indicated by a, an input shift data signal is indicated by sh, a left/right shift selection signal is indicated by sel, and an output signal is indicated by b in an n-bit shifter, b is expressed by the following logic equation:

$$b = \begin{cases} a \ll sh & (sel = 1) \\ a \gg sh & (sel = 0) \end{cases} \quad (1)$$

Herein, << indicates a left shift, while >> indicates a right shift. When the sh is assumed to be an n-bit signal, and $sh_i$ is assumed to be the sh in the ith digit, the sh can be expanded as follows:

$$sh = sh_{n-1} \cdot 2^{n-1} + sh_{n-2} \cdot 2^{n-2} + \ldots + sh_2 \cdot 2^2 + sh_1 \cdot 2^1 + sh_0 \cdot 2^0 \quad (2)$$

Based on the above equations (1) and (2), the b can be expanded as follows:

$$b = \quad (3)$$
$$\begin{cases} a \ll (sh_0 \cdot 2^0) \ll (sh_1 \cdot 2^1) \ll (sh_2 \cdot 2^2) \ll \cdots \ll (sh_{n-1} \cdot 2^{n-1}) & (sel = 1) \\ a \gg (sh_0 \cdot 2^0) \gg (sh_1 \cdot 2^1) \gg (sh_2 \cdot 2^2) \gg \cdots \gg (sh_{n-1} \cdot 2^{n-1}) & (sel = 0) \end{cases}$$

The barrel shifter constitutes a circuit which determines the amount of a shift for each bit of the sh, based on the equation (3).

Figure 6:
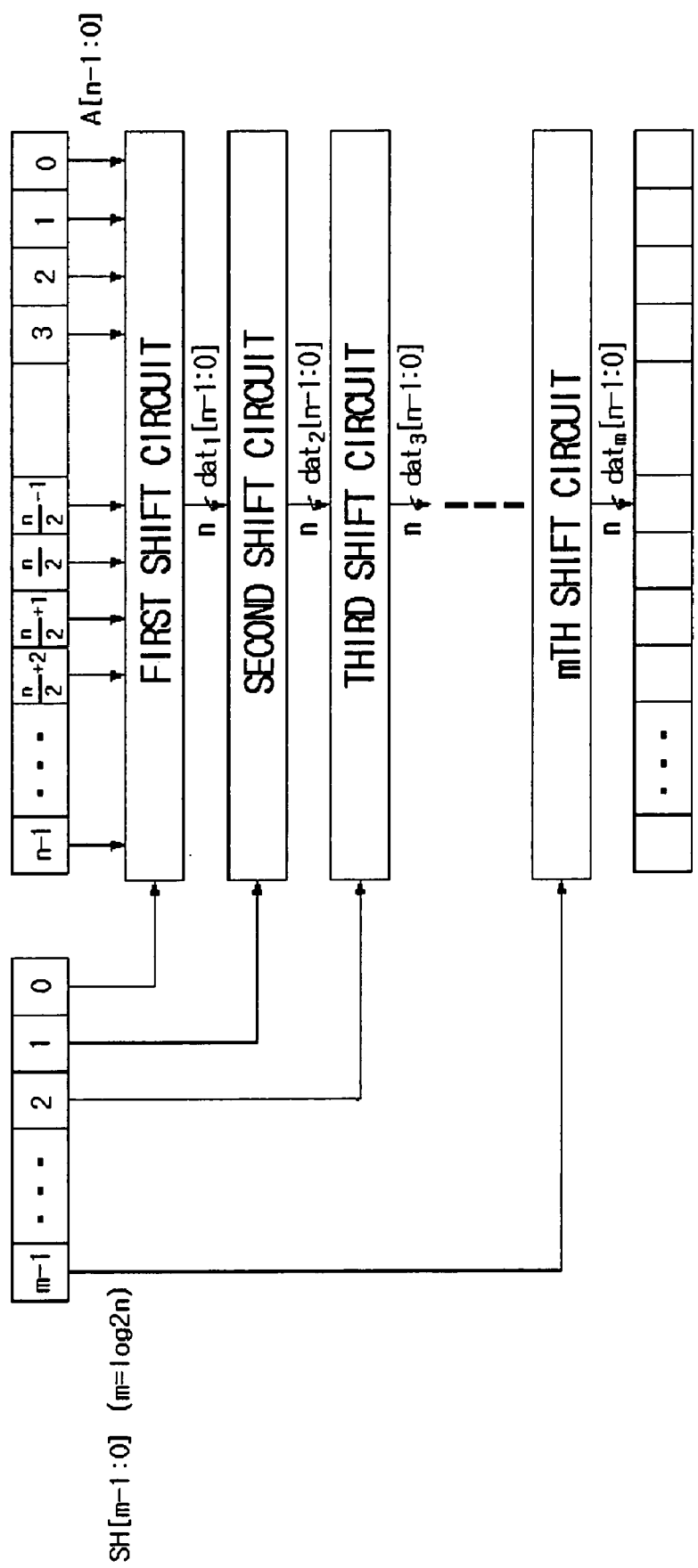
FIG. 6 is a diagram showing an n-bit barrel shifter.

A configuration of a left shifting n-bit barrel shifter (as shown in FIG. 6) and its operation will be shown. The n-bit barrel shifter comprises an n-bit input data signal A[n−1:0] to the barrel shifter, m-bit shift amount input data SH[m−1:0] (m=log2n), a shifted output data signal B[n−1], a first shift circuit, a second shift circuit, and an mth shift circuit. The first shift circuit outputs the one-bit shifted value of an A[m−1:0] to an output signal $dat_1$[n−1:0] when SH[0] is high, and outputs the value of the A[m−1:0] without alteration to the output signal $dat_1$[n−1:0] when the SH[0] is low. The second shift circuit outputs the two-bit shifted value to an output signal $dat_2$[n−1:0] when SH[1] is high, and the value without alteration to the output signal $dat_2$[n−1:0] when the SH[1] is low. The mth shift circuit outputs the m-bit shifted value of input data $dat_{m-1}$[n−1:0] when SH[m−1] is high, and outputs the value of the input data $data_{m-1}$[n−1:0] without alteration to an output signal $dat_m$[n−1:0] when the SH[m−1] is low.

Figure 7:
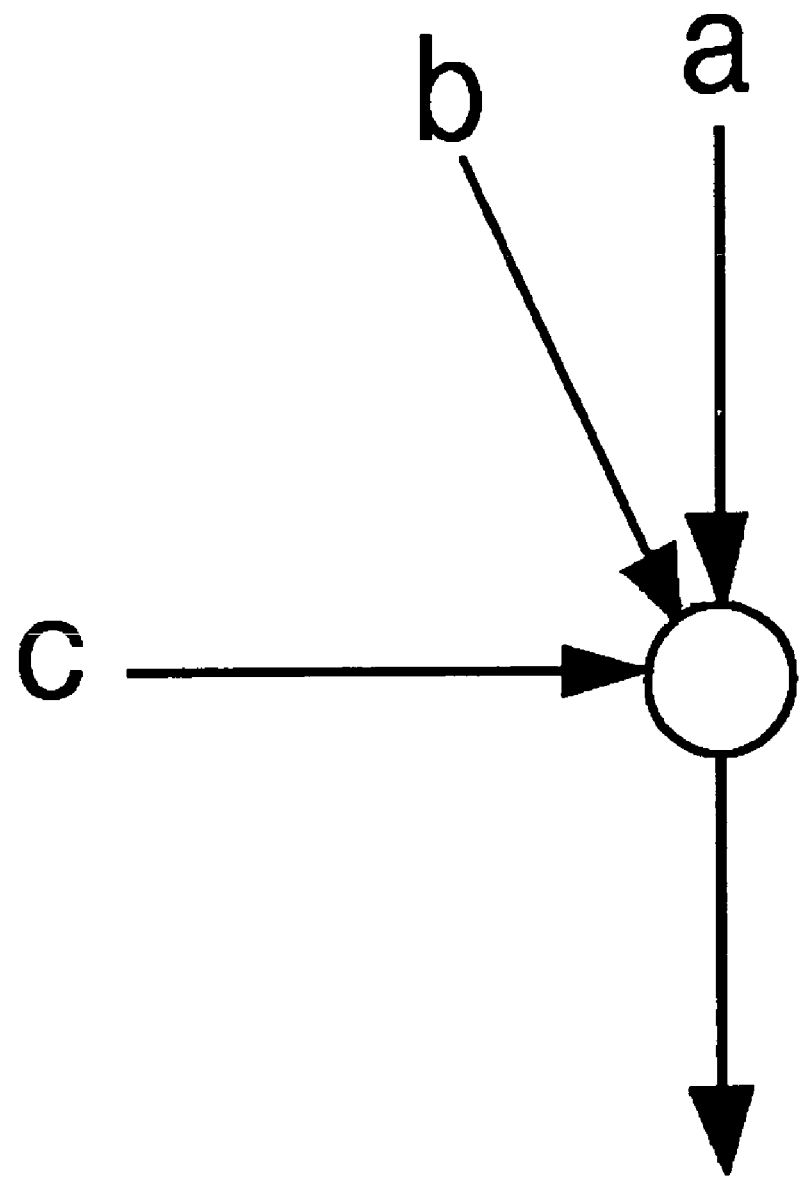
FIG. 7 is a diagram showing a shift circuit for each bit used in the barrel shifter.

Each shift circuit is constituted using a circuit in FIG. 7, for each bit. The circuit in FIG. 7 constitutes a logic expressed as follows, by using the input signals a and b, an input signal c and an output signal d.

$$d = a\bar{c} + bc$$

The first shift circuit is constituted by connecting the signals to the circuit in FIG. 7 as follows:

$$a = A[i] \quad (4)$$

$$b = \begin{cases} A[i+1] & (0 \leq i \leq n-2) \\ A[0] & (i = n-1) \end{cases}$$

$$c = SH[0]$$

$$d = dat_1[i]$$

The second shift circuit is constituted by connecting the signals to the circuit in FIG. 7 as follows:

$$a = dat_1[i] \quad (5)$$

$$b = \begin{cases} dat_1[i+2] & (0 \leq i \leq n-3) \\ dat_1[i-n+2] & (n-2 \leq i \leq n-1) \end{cases}$$

$$c = SH[1]$$

$$d = dat_2[i]$$

The mth shift circuit is constituted by connecting the signals to the circuit in FIG. 7 as follows:

$$a = dat_{m-1}[i] \quad (6)$$

$$b = \begin{cases} dat_{m-1}[i+m] & (0 \leq i \leq n-m) \\ dat_{m-1}[i-n+m] & (n-m+1 \leq i \leq n-1) \end{cases}$$

$$c = SH[m-1]$$

$$d = dat_m[i]$$

The circuit configuration of a right shift circuit is the same just except that the orientation of a shift in the right shift circuit is changed.

Since the paths of each shift circuit are the same, the delay time of each shift circuit is uniquely determined. Herein, the delay time of the barrel shifter in FIG. 6 is indicated by $T_{barrel}$, while the delay of the shift circuit in FIG. 7 is indicated by a. When the number of bits of input data to the barrel shifter is indicated by n, the number of the shift circuits connected in series becomes $\log_2 n$, so that the delay time of the barrel shifter can be expressed as follows:

$$T_{barrel} = \alpha \cdot \log_2 n \quad (7)$$

(Delay of Adder)

When the ith digits of the input signals to an n-bit carry look ahead adder are indicated by $a_i$, $b_i$, respectively, an ith digit carry propagate term $p_i$, an ith digit carry generate term $g_i$, a carry output $c_{i+1}$ for an (i+1)th digit, and a sum output $sum_i$ for the ith digit can be defined using the following logic equations:

$$p_i = a_i + b_i$$

$$g_i = a_i \cdot b_i$$

$$sum_i = a_i \oplus b_i \oplus c_i$$

$$c_{i+1} = g_i + p_i \cdot c_i \quad (8)$$

where + indicates a logical sum, · indicates a logical product, and ⊕ indicates an exclusive logical sum. If $c_i$ is expanded with respect to a group from the hth digit to the ith digit (in which h≦i, and h and i are arbitrary numbers, respectively)

$$c_{i+1} = g_i + p_i(g_i + p_i c_i) \quad (9)$$
$$= g_i + p_i g_{i-1} + p_i p_{i-1} \cdot (g_{i-1} + p_{i-1} \cdot c_{i-1})$$
$$\vdots$$
$$= g_i + p_i g_{i-1} + p_i p_{i-1} g_{i-2} + \cdots + p_i p_{i-1} \cdots p_{h+1} g_h +$$
$$p_i p_{i-1} p_{i-2} \cdots p_{h+1} p_h c_h$$
$$= G_{h,i} + P_{h,i} c_h$$

in which $G_{h,i}$, $P_{h,i}$ are expressed as follows:

$$G_{h,i} = g_i + p_i g_{i-1} + p_i p_{i-1} g_{i-1} + \ldots + p_i p_{i-1} p_{i-2} \cdots p_{h+1} g_h$$

$$P_{h,i} = p_i p_{i-1} p_{i-2} \cdots p_{k+1} p_k \quad (10)$$

in which $G_{i,i} = g_i$, and $P_{i,i} = p_i$.

In this case, $G_{h,i}$ denotes the group carry generate term from the hth digit to the ith digit, while $P_{h,i}$ denotes the group carry propagate term from the hth digit to the ith digit. The $G_{h,i}$ will be hereinafter referred to as the group carry generate term, and the $P_{h,i}$ will be hereinafter referred to as the group carry propagate term.

The above equation (10) can be rewritten as the following equation (in which j is an arbitrary integer, and h≦j<i))

$$G_{h,i} = G_{j+1,i} + P_{j+1,i} G_{h-j}$$

$$P_{h,i} = P_{h,j} P_{j+1,i} \quad (11)$$

The equation (11) indicate that "when a carry is output from the group from the hth digit to the ith digit, the carry is generated in the upper portion (j+1, i) of the group, or the carry from the lower portion (h, j) is propagated to the upper portion". Accordingly, it can be found that by appropriately selecting the bit lengths of a certain group and the group of bits lower than those of the certain group, generation of the carry generate term and the carry propagate term for the upper group and the carry generation for the lower group can be processed in parallel. Further, by adopting hierarchization of the above mentioned configuration, addition of multi-bit lengths can be sped up. The common adder which has adopted the carry look ahead method as described above appropriately selects the bit length, thereby processing carry generation and generation of the carry generate term and the carry propagate term in parallel.

Figure 5:
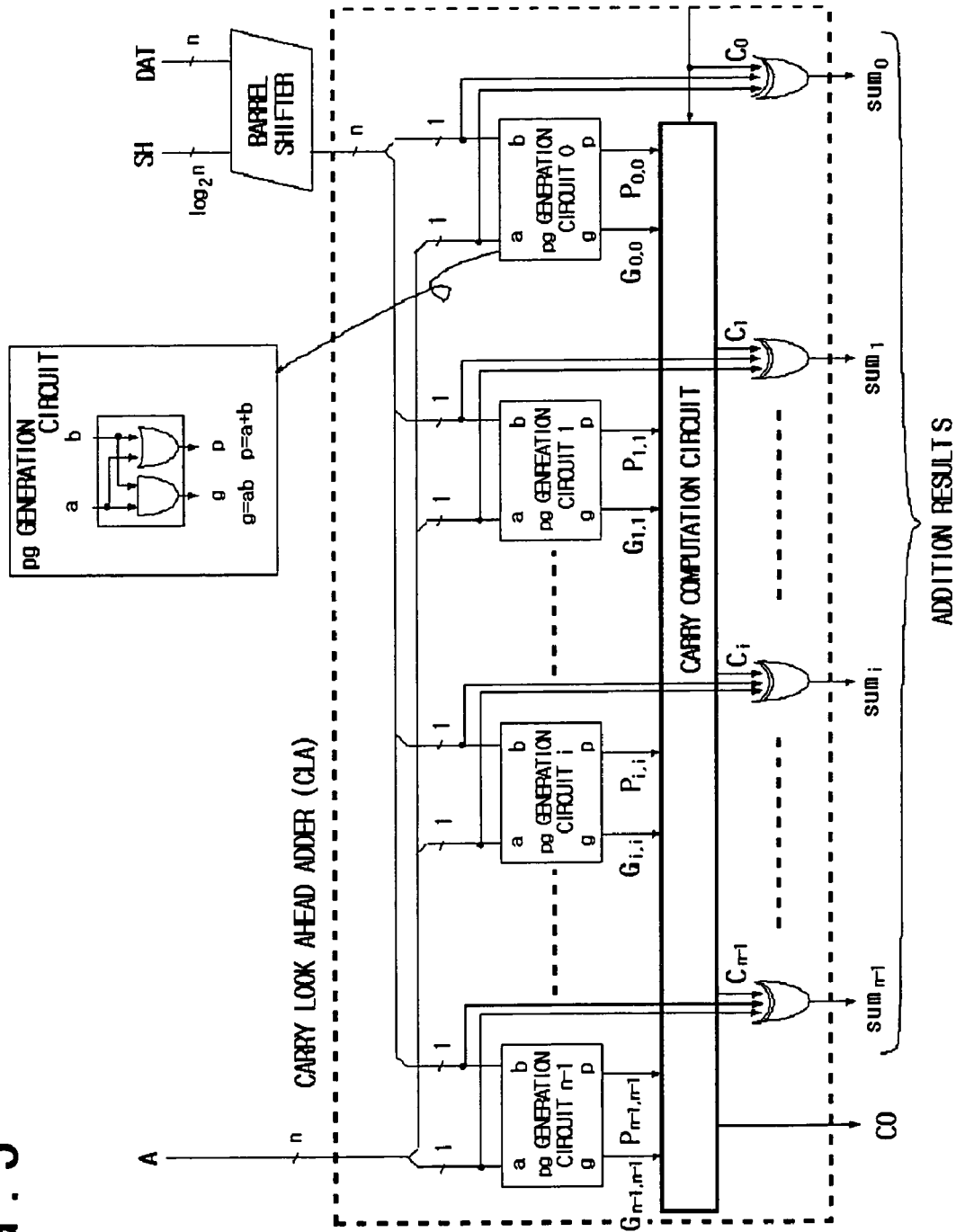
FIG. 5 is a diagram showing a digital circuit according to a prior art.

The configuration and the operation of the n-bit carry look ahead adder in FIG. 5, will be described in the below as a comparative example. Referring to FIG. 5, the n-bit carry look ahead adder (CLA) is constituted from a pg generation circuit 0, a pg generation circuit 1, a pg generation circuit i, a pg generation circuit n−1, a carry computation circuit, and an exclusive OR circuit. The pg generation circuit 0 receives the respective 0th (least significant) digits $A_0$ and $B_0$ of the input signals A and B and outputs a carry generate term $G_{0,0}$ and a carry propagate term $P_{0,0}$. The pg generation circuit 1 receives the respective first digits $A_1$ and $B_1$ of the input signals A and B and outputs a carry generate term $G_{1,1}$ and a carry propagate term $P_{1,1}$. The pg generation circuit i receives the respective ith digits $A_i$ and $B_i$ of the input signals A and B, in which 0≦i≦n−1, and outputs a carry generate term $G_{i,i}$ and a carry propagate term $P_{i,i}$. The pg generation circuit n−1 receives the respective n−1th digits $A_{n-1}$ and $B_{n-1}$ of the input signals A and B and outputs a carry generate term $G_{n-1, n-1}$ and a carry propagate term $P_{n-1, n-1}$. The carry computation circuit receives the $G_{i,i}$ and the $P_{i,i}$, and outputs the i+1th carry $C_{i+1}$ (refer to the equation (8)). The exclusive OR circuit receives the $A_i$, $B_i$, and $C_i$ and outputs the addition result sums (refer to the equation (8)).

Figure 8:
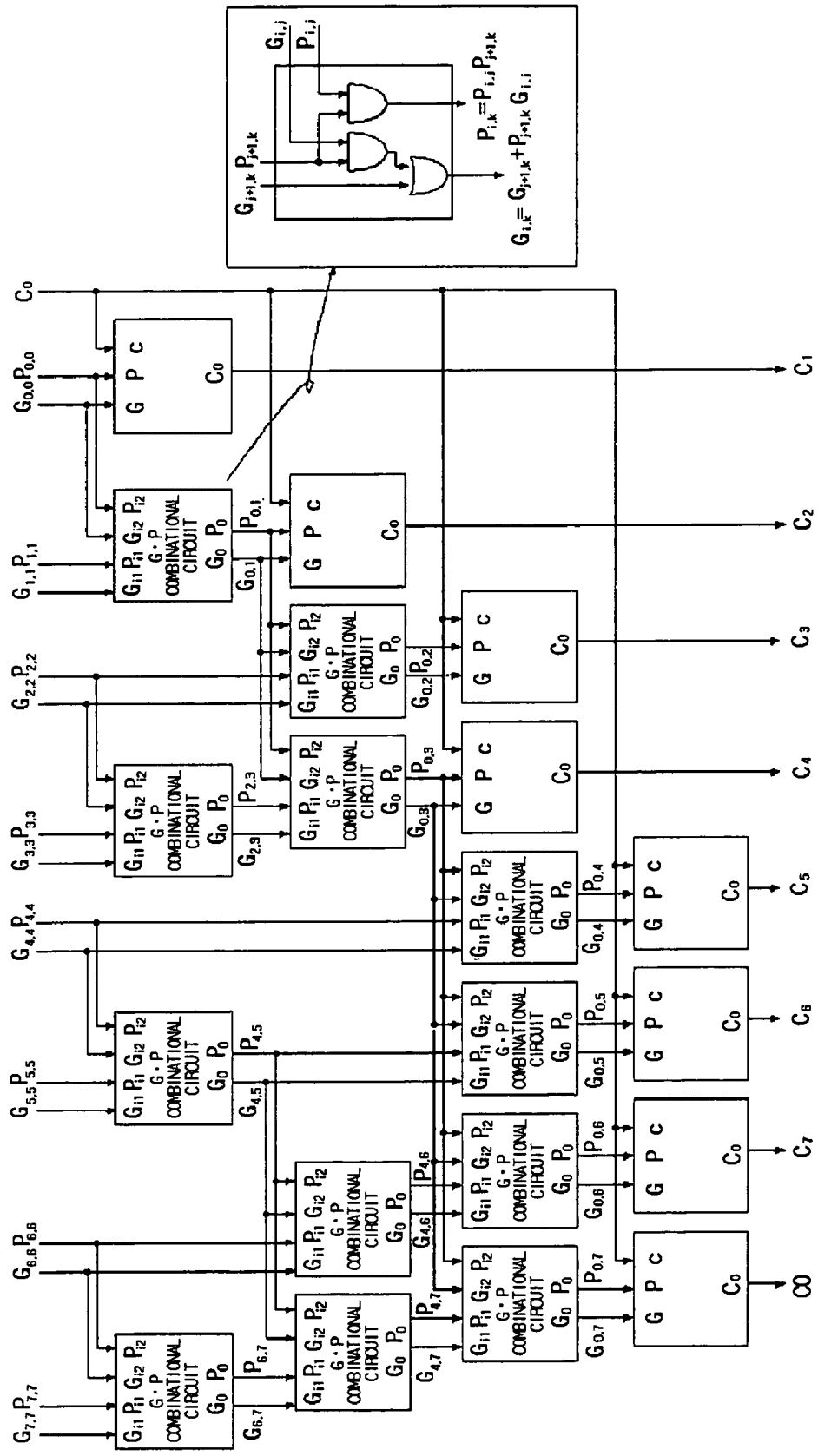
FIG. 8 is a diagram showing an eight-bit carry computation circuit according to the prior art.

The carry computation circuit calculates the output of the carry $C_{i+1}$ using the formulas of the group carry generate term G and the group carry propagate term P shown in the equations (9) and (11). FIG. 8 shows an eight-bit carry computation circuit in which a group is constituted from two digits (j−h=i−j=2). This carry computation circuit is constituted from second-stage G·P combinational circuits, each for receiving the two Gs and the two Ps outputted from G·P combinational circuits in the first stage and outputting combined outputs of the G and the P, third-stage G·P combinational circuits, each for receiving the two Gs and the two Ps in the second stage, and outputting combined outputs of the G and the P, and carry output circuits, each for receiving the G, P, and $c_0$ in the third stage and outputting a carry. In the case of an n-bit carry computation circuit for respective M groups (in which M and n are arbitrary integers), the G·P combinational circuits compute respective M combined results of the G and the P, so that the number of stages becomes $\log_M n$. Meanwhile, when the G·P computation circuit is constituted from a CMOS circuit, the number of fan-ins is often limited to four or less for a higher-speed operation, in most instances.

Next, the delay of the adder in the prior art will be determined. The delays of the pg generation circuits and the exclusive OR circuits can be defined irrespective of the number of bits for the adder. Thus, when the delay of the G·P combinational circuits is indicated by β and a combination of the delays of the pg generation circuits and the exclusive OR circuits is indicated by γ, a delay $T_{adder}$ of the adder can be expressed as follows:

$$T_{adder} = \beta \cdot \log_M n + \gamma \quad (12)$$

(Overall Delay)

Figure 9:
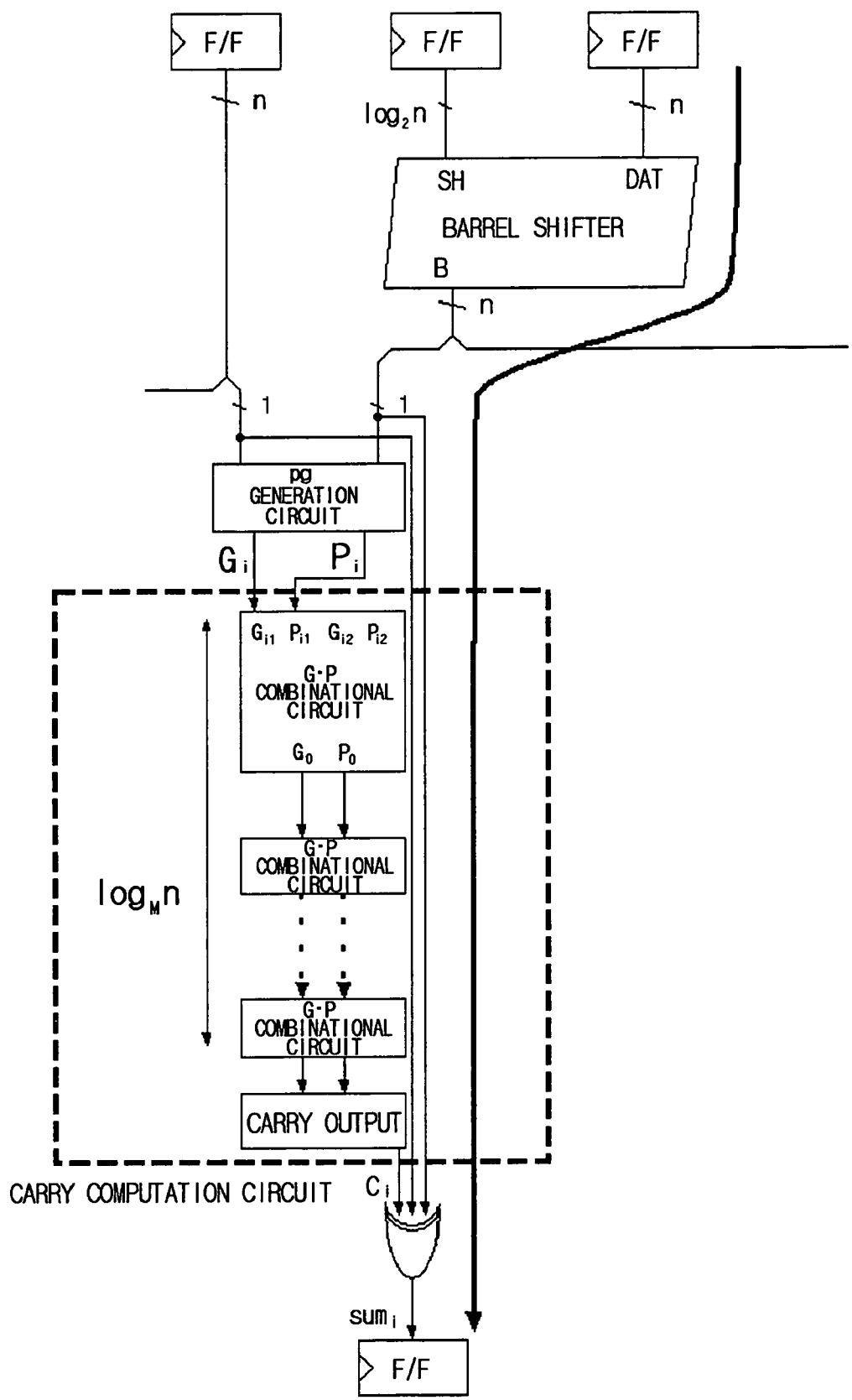
FIG. 9 is a diagram showing a critical path in the circuit in FIG. 5.

Based on the foregoing description, in the prior art, in which the barrel shifter and the adder are connected in series, the critical path becomes a portion indicated by an arrow line in FIG. 9, so that the delay $T_{old}$ is defined as follows, based on the equations (7) and (12).

$$T_{old} = T_{barrel} + T_{adder} + \alpha \cdot \log_2 n + \beta \cdot \log_M n + \gamma \quad (13)$$

Next, the delay of the critical path of the circuit according to the present embodiment shown in FIG. 1 will be considered. Referring to FIG. 1, it is assumed that preceding stages for the input signals SH and DAT supplied to the barrel shifter and the input signal A supplied to the adders are flip-flops. When data is input from the input signal A, an (i+1)th group G·P·SUM computation circuit (in which 0≦i≦k) outputs a $Gb_i$, a $Pb_i$, the $Sum0^i$, and the $Sum1_i$. A maximum delay $T_{pat}$ from the input signal A to the output signal of the G·P·SUM computation circuit is defined as follows based on the equation (12), since the delays of the G·P computation circuits are the largest.

$$T_{pat} = \beta \cdot \log_M m + \gamma \quad (14)$$

Next, a maximum delay $T_{bar}$ from the input signals SH and DAT to the barrel shifter to the output signal of the circuit according to the present embodiment is defined as follows based on the equation (7).

$$T_{bar} = \alpha \cdot \log_2 n \quad (15)$$

Since the size of the configuration of the carry computation circuit is smaller than that of the prior art by m bits, a maximum delay $T_{carry}$ is defined as follows based on the equation (12).

$$T_{carry} = \beta \cdot \log_M \frac{n}{m} \qquad (16)$$

Based on the foregoing description, when the circuit is constituted from the circuit according to the present invention, the delay of the critical path is defined as follows:

$$T_{all} = \begin{cases} T_{pat} + T_{carry} = \beta \cdot \log_M m + \gamma + \beta \cdot \log_M \frac{n}{m} & (T_{pat} \geq T_{bar}) \\ T_{bar} + T_{carry} = \alpha \cdot \log_2 n + \beta \cdot \log_M \frac{n}{m} & (T_{pat} < T_{bar}) \end{cases} \qquad (17)$$

In the above equation (17), m≧2, and m<n and hence $T_{pat} < T_{bar}$ holds. Thus, the following equation is obtained (refer to FIG. 4).

$$T_{new} = T_{bar} + T_{carry} = \alpha \cdot \log_2 n + \beta \cdot \log_M \frac{n}{m} \qquad (18)$$

Figure 4:
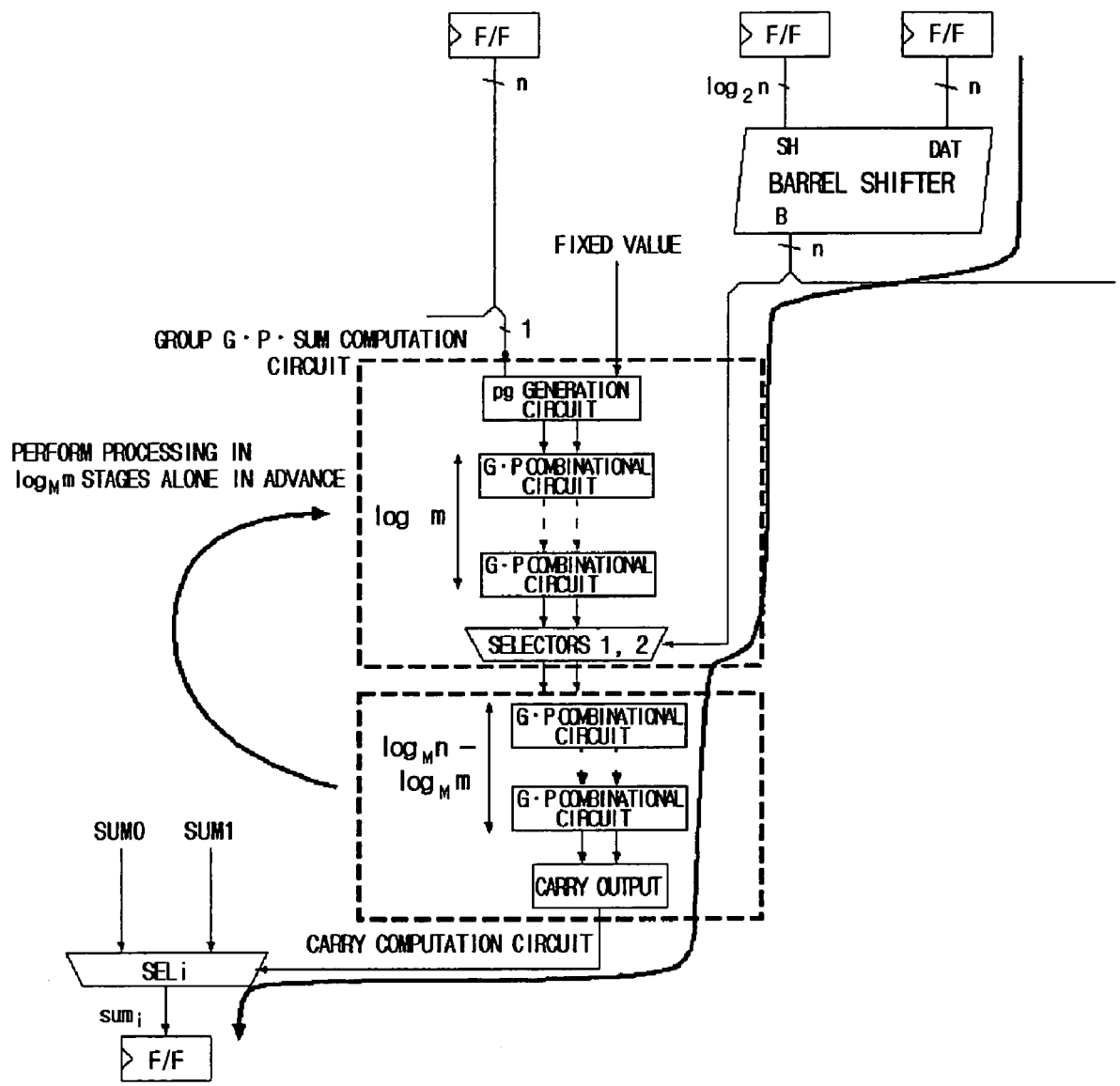
FIG. 4 is a diagram showing a critical path in the circuit in FIG. 1.

A delay difference $T_{dif}$ between a critical path delay $T_{old}$ of a conventional circuit shown in FIG. 9 and a critical path delay $T_{new}$ of a circuit in the above embodiment shown in FIG. 4 is obtained as follows, based on the equations (13) and (18).

$$\begin{aligned} T_{dif} &= T_{new} - T_{old} \\ &= (\alpha \cdot \log_2 n + \beta \cdot \log_M n + \gamma) - \left(\alpha \cdot \log_2 n + \beta \cdot \log_M \frac{n}{m}\right) \\ &= \beta \cdot \log_M m + \gamma \end{aligned} \qquad (19)$$

Since m>1, $\log_M m$ is a positive value. Accordingly, the operation can be performed faster than that of the conventional circuit just by $T_{dif}$.

As described above, according to the circuit in FIG. 1, by using the output signal of the barrel shifter as a selection signal in the combinational circuit in which the barrel shifter and the adders are connected in series, the effect of enabling the faster operations of the adders can be brought about.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A digital circuit comprising:
   a computation unit for receiving a signal a out of the signal a and a signal b both with a number of bits being m, wherein the signals a and b range from zero to $2^{m-1}$, and calculating and outputting for the signal a and each of $2^m$ values of zero to $2^{m-1}$, a carry generate term $G_i$, a carry propagate term $P_i$, and a sum $S_i$, where an index i ranges from zero to $2^{m-1}$; and
   a selection unit for receiving the carry generate term $G_i$, the carry propagate term $P_i$, and the sum $S_i$ calculated by said computation unit and the signal b, and selecting the carry generate term $G_b$, the carry propagate term $P_b$, and the sum $S_b$ when i is equal to the signal b, for output.

2. The digital circuit according to claim 1, wherein said selection unit outputs a sum $S0_b$ and a sum $S1_b$, respectively, the sum $S0_b$ being the sum $S_b$ when a carry input is zero and the sum $S1_b$ being the sum $S_b$ when the carry input is one.

3. The digital circuit according to claim 2, further comprising:
   a carry computation unit for receiving the carry generate term $G_b$ and the carry propagate term $P_b$ to calculate the carry input to output the calculated carry input; and
   a second selection unit for selecting either of the sum $S0_b$ and the sum $S1_b$ according to the carry input computed by said carry computation unit to output the selected sum.

4. The digital circuit according to claim 1, further comprising:
   a barrel shifter for outputting the signal b to be supplied to said selection unit.

5. A digital circuit comprising:
   a computation unit for receiving a first signal out of first and second signals both having a predetermined number of bits, and calculating and outputting for the first signal and each of values which the second signal can take, a carry generate term, a carry propagate term, and a sum;
   a selection unit for receiving a plurality of carry generate terms, a plurality of carry propagate terms, and a plurality of the sums, calculated by said computation unit for respective values which the second signal can take, and the second signal, and selecting, for output, the i-th carry generate term, the i-th carry propagate term, and the i-th sum, wherein the index i is equal to the value of the second signal.

6. The digital circuit according to claim 5, wherein said selection unit outputs two kinds of i-th sums in association with respective cases of a carry input being zero and one, with the index i being equal to the value of the second signal.

7. The digital circuit according to claim 5, further comprising a barrel shifter for receiving a data signal and shift signal and for shifting the data signal by a bit number specified by the shift signal to output the shifted data signal as the second signal supplied to said selection unit.

* * * * *